(12) United States Patent
Cooper

(10) Patent No.: US 10,394,838 B2
(45) Date of Patent: Aug. 27, 2019

(54) APP STORE SEARCHING

(71) Applicant: Apple Inc., Cupertino, CA (US)

(72) Inventor: Edwin R. Cooper, Oakland, CA (US)

(73) Assignee: Apple Inc., Cupertino, CA (US)

( * ) Notice: Subject to any disclaimer, the term of this patent is extended or adjusted under 35 U.S.C. 154(b) by 738 days.

(21) Appl. No.: 14/938,745

(22) Filed: Nov. 11, 2015

(65) Prior Publication Data

US 2017/0132294 A1    May 11, 2017

(51) Int. Cl.
*G06F 16/248*    (2019.01)

(52) U.S. Cl.
CPC ................ *G06F 16/248* (2019.01)

(58) Field of Classification Search
USPC ........................................ 707/722
See application file for complete search history.

(56) References Cited

U.S. PATENT DOCUMENTS

| | | | | |
|---|---|---|---|---|
| 8,407,685 | B2* | 3/2013 | Clark .................. | G06F 9/445 709/224 |
| 2013/0325892 | A1* | 12/2013 | Edwards ............... | G06F 16/951 707/769 |
| 2014/0068593 | A1* | 3/2014 | McErlane ............... | G06F 8/61 717/171 |
| 2014/0164520 | A1* | 6/2014 | Fan ..................... | G06F 8/60 709/204 |
| 2014/0201760 | A1* | 7/2014 | Kraljic ................. | G06F 9/543 718/108 |
| 2016/0216947 | A1* | 7/2016 | Hassibi ................ | H04L 51/046 |
| 2016/0370784 | A1* | 12/2016 | Gruenewald ........ | G05B 19/056 |

* cited by examiner

*Primary Examiner* — Cheyne D Ly
(74) *Attorney, Agent, or Firm* — Womble Bond Dickinson (US) LLP

(57) ABSTRACT

Methods and systems for searching for applications in an app store use, in one embodiment, distribution data to create an association between a first application and a first set of other applications in the app store, and the association is used to provide search results in response to a navigational search query that specifies the first application by name so that the search results include the first application and the first set of other applications. The distribution data indicates the number of downloads for applications in the app store that resulted from each search query in a set of search queries.

16 Claims, 7 Drawing Sheets

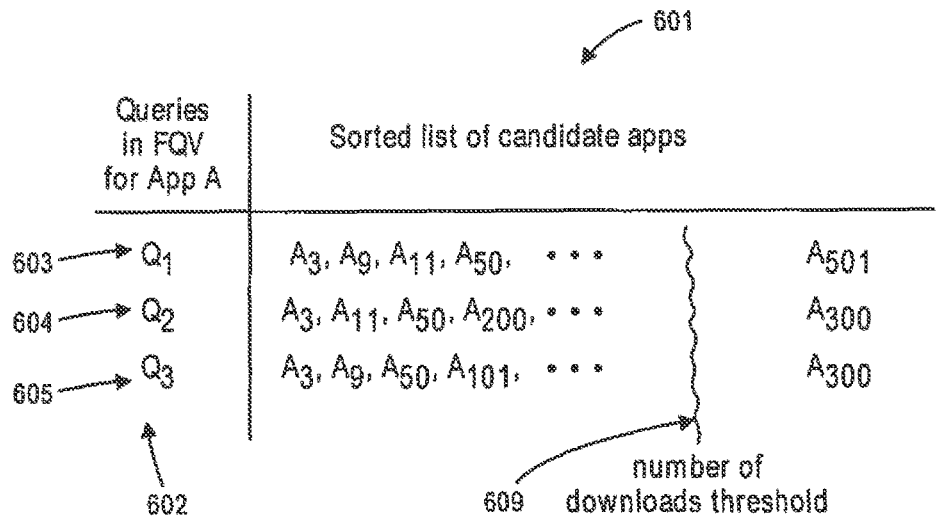
FIG. 6
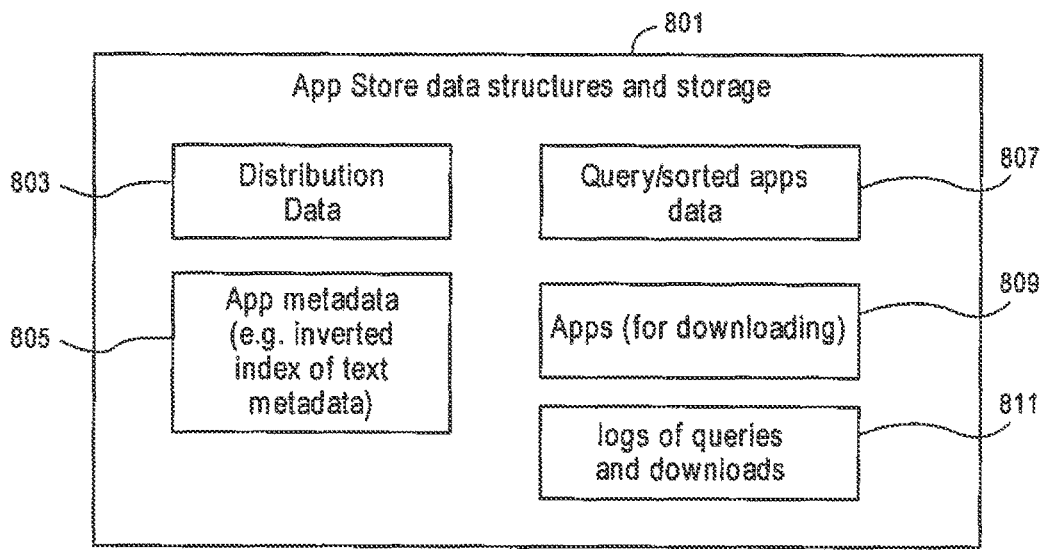
FIG. 7
FIG. 8

APP STORE SEARCHING

BACKGROUND OF THE INVENTION

The present disclosure relates generally to searches for software applications and to searches for specific software applications.

In recent years, downloading of software applications (or "apps") from an on-line app store has become a popular method for obtaining software applications. Users can download a software application (also referred to as an "app") from an on-line app store onto their device, such as a smartphone or desktop computer or laptop computer, and then install the app on their device. Prior to downloading an app, users often perform searches for either (1) a class (or type) of app or (2) a particular app specified by its name (or a portion of its name).

The number of apps has increased significantly, and therefore users have a large number of apps available to them. However, this large number can make finding an app difficult. When a user wants to find an app to fill a particular need, the number of apps returned in search results from a keyword search can be overwhelming, and the order of apps in the list may not be relevant to the user's need. Prior systems have attempted to improve the search results by classifying a search query and producing search results based on the classification of the search query; see, for example, U.S. Patent Application Publication No. US2013/0325892.

SUMMARY OF THE DESCRIPTION

The embodiments described herein can provide improved search results, particularly when a user is searching in an app store for a particular application by using the name of the application (or at least a portion or variant of the name) in a search query. This type of search query is referred to as a navigational search query. A method, in one embodiment, for processing a search query can include: receiving, from a client device, a search query which includes at least a portion of a name of an existing application in the app store; determining that the search query is a navigational search query; performing a search of one or more data structures using the navigational search query to produce a list of search results; transmitting, to the client device, the name of the existing application in search results; and transmitting, to the client device, names of a first set of one or more other applications that are similar to the existing application based on an overlap of functional search queries that resulted in downloads of the existing application and functional search queries that resulted in downloads of the first set of other applications. In one embodiment, the names of the first set of other applications can be generated from distribution data, described herein, by identifying functional search queries that resulted in downloads of the existing application and then using those identified functional search queries to identify other applications that have the same functional capabilities or goals as the existing application. In one embodiment, a search query can be classified as a functional search query (and not a navigational search query) when it is estimated that users are searching for an app that performs a function or provides a capability; functional search queries typically result in the download of many different apps each of which provides the function or capability. In one embodiment, the method can also include: transmitting, to the client device, names of a second set of other applications that are found based on textual matches with application metadata in application description pages. In one embodiment, the one or more data structures include the application metadata in an inverted full text index database containing text from the application description pages. The one or more data structures can include a sorted list of other applications for each navigational search query in a set of navigational search queries containing at least a portion of the name of an existing application in the app store, and this sorted list for each navigational search query can be based on distribution data for the functional search queries that resulted in downloads of the other applications, where the distribution data can represent the number of downloads of the other applications that resulted from the functional search queries. In one embodiment, a search query is classified as a navigational search query when distribution data, which represents the number of downloads that resulted from the search query, indicates a small number (e.g. less than 5 or less than 3) of unique applications were downloaded as a result of the search query. In one embodiment, a search query is classified as an application specific query when the distribution data indicates that predominately one application is downloaded as a result of the search query (e.g. more than 75% of downloads resulting from the search query were for one unique application). A navigational search query can also be an application specific query. In one embodiment, the search results transmitted to the client device are sorted to show the results in an order in which the existing application (specified by name in the search query) is listed first, followed by the first set of other applications and then the second set of other applications.

Another aspect of this disclosure relates to how distribution data is used to determine that a first application is similar to a first set of other applications so that a search query specifying the name (or portion of the name) of the first application causes the search system to return, as search results, the first application and the first set of other applications. A method, in one embodiment, for using such distribution data can include: collecting distribution data for search queries and resulting downloads of applications from the app store; classifying the search queries as either functional search queries or navigational search queries based upon the distribution data; determining, for a first application in the app store, a set of functional search queries used to search for the first application based upon the distribution data which indicates user selections to download the first application from search results produced from the set of functional search queries; and determining, for the first application, a first set of one or more other applications that are similar to the first application based upon the distribution data which indicates an overlap of the set functional queries (that led to downloads of the first application) and functional search queries that led to downloads of the first set of other applications. In one embodiment, the functional search queries that resulted in downloads of the first set of other applications are a subset of the functional search queries that resulted in downloads of the first application, in one embodiment, the method can include: storing, in one or more data structures, an association between the first application and the first set of other applications. This association can be used at search time (when a search query is received) to cause the search results to include names of both the first application and the first set of other applications; there are a variety of ways in which this association can be used and they are described further below. In one embodiment, the association is used to provide search results in response to a navigational search query that specifies the first application by name so that the search results include the names of the first application and the first set of other applications. In one embodiment, the distribution data is used to repeat the process of determining a set of other apps for each app in a set of apps in the app store such that for each app in the set of apps there is a stored association between each app in the set of apps and its set of other similar apps.

The methods described herein can be implemented by a set of one or more servers that are part of or separate from an app store. The methods described herein can also be implemented by one or more data processing systems (such as one or more servers) which execute executable instructions, stored on one or more non-transitory machine readable media, that cause the one or more data processing systems to perform one or more methods described herein. Thus, the embodiments described herein include methods, data processing systems, and non-transitory machine readable media.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements.

FIG. 6 shows an example of a data structure that can be generated as part of the method shown in FIG. 5.

FIG. 7 shows an example of a data structure that stores the association between an app and other similar apps as determined according to one or more embodiments described herein, such as the methods shown in FIGS. 4 and 5.

FIG. 8 shows an example of a storage system and stored data structures which can be used with an app store according to one or more embodiments described herein.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
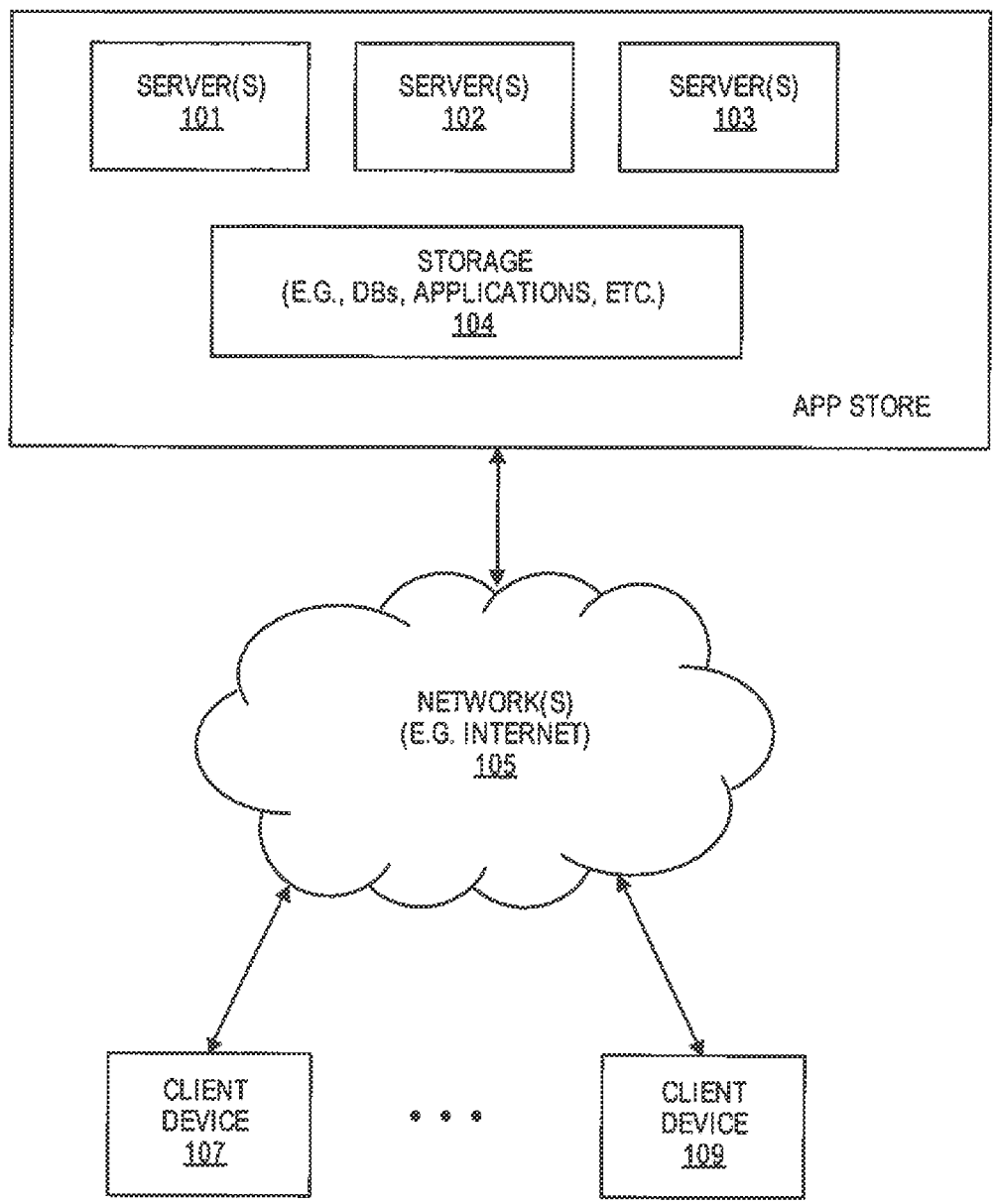
FIG. 1 shows an overview of an environment in which the embodiments described herein operate.

The embodiment described herein can operate in the environment and context of an app store from which one or more users, using client devices, can search for and download one or more applications (also referred to as apps). A description of this environment and context will be provided in conjunction with FIG. 1. An app store can include one or more servers, such as servers 101, 102, and 103, that can provide the functionality described herein. For example, server(s) 101 can implement the methods of FIGS. 4 and 5 to create the data structures used when a search query is received from one or more client devices, such as client devices 107 and 109 which can take a variety of different forms (e.g., tablet computer such as an iPad, smartphone such as an iPhone, laptop computer, desktop computer, network media player such as an Apple TV, game/entertainment system, or other consumer electronic device). The client devices can be coupled to the app store (or to a searching service that operates independently of the app store) by one or more networks 105, such as the Internet, which provides for the data communication between the client devices and the app store so that the client devices can send search queries to the app store, receive search results and send requests to download one or more apps and then receive the downloads of the one or more apps. The server 101, in one embodiment, can create the data structures used in searching (e.g. an association of an app with other similar apps, such as the association provided by a data structure such as the table shown in FIG. 7), and store those data structures in storage 104 for later use by server(s) 102 which can be configured to receive search queries from client devices and then perform searches of one or more data structures in order to provide search results to the client device that sent the search query. The division of services between server(s) 101 and server(s) 102 allows the server(s) 102 to perform searches at any time while server(s) 101 is busy processing distribution data according to the one or more embodiments described herein so that the data structures can be created and stored in storage 104 without interfering with the search performed by server(s) 102. The server(s) 102 can implement the method of FIG. 10 to receive one or more search queries and respond to those search queries with search results as described herein. The server(s) 103 can be one or more servers that respond to requests to download one or more apps to the requesting client devices, such as client devices 107 and 109; the requests to download are stored in logs along with at least the search query which immediately preceded the download request so that the system's logs store an association between a download request for an app and a preceding search query that resulted in that download. These logs can be stored in storage 104 along with binary (executable) forms of the apps suitable for downloading to client devices and metadata for the apps (e.g. indexed text meta data in the form of an inverted full text index of application description pages), and other data structures. FIG. 8 shows an example of the storage 104 which can be used in one or more embodiments. It will be appreciated that, while FIG. 1 shows a plurality of servers each providing different functions, in other embodiments, the functions may be provided by fewer servers (e.g., one server provides all functions of server(s) 101, server(s) 102, and server(s) 103 or two servers provide all of those functions). It will also be appreciated that the downloading of one or more apps may involve purchases/payments for the apps as is known in the art.

An app store, such as the app store shown in FIG. 1 can collect information about queries used to search for applications and about downloads that result from a user's selection of an app shown in the search results produced by a search query. This information can be collected in logs maintained by the app store which record the queries that were used and the downloads that resulted from these queries. In one embodiment, the one or more servers 102 can maintain a record during a user's search session of the queries used and the selections made from the search results of those queries, and this record can be recorded in one or more logs. In one embodiment, the app store can keep track of user's selections which seek further information about a particular application without necessarily downloading the application in addition to keeping track of downloads that resulted from a particular search query. In another embodiment, the app store can keep track of only downloads that resulted from search results in order to limit the amount of information which may be relevant; in other words, downloads may be considered more relevant and more important information than user selections for more information about applications which do not result in downloads.

Figures 2, 3:
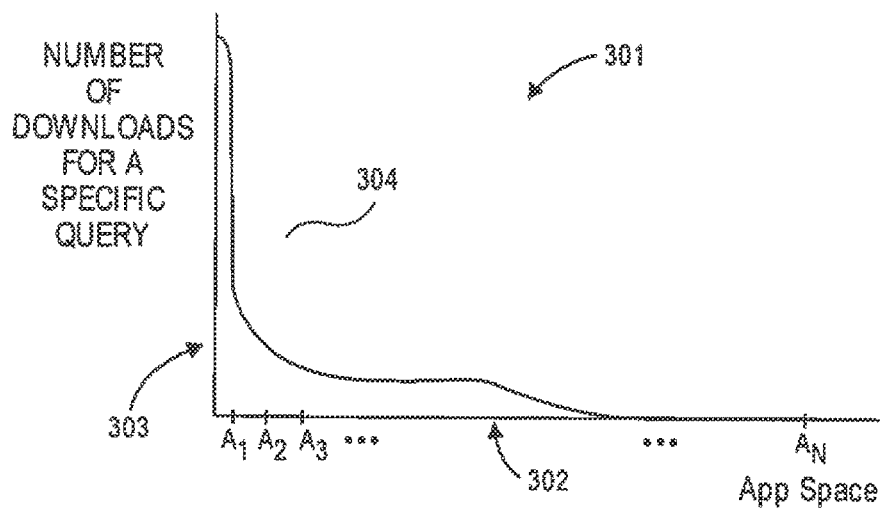
FIG. 2 shows an example of a data structure that stores distribution data according to one or more embodiments described herein.
FIG. 3 is a graph that depicts a typical distribution of downloads (across all apps in an app store) for a search query that is directed at a specific app, such as a search query that includes the name of the app.

FIG. 2 shows an example of distribution data 201 arranged in table form. Each row represents the number of downloads that resulted from a particular search query for each application in a set of applications such as all of the applications in an app store. Column 203 shows the set of queries that the app store has recorded in one or more logs where these queries have resulted in a download of one or more apps on the app store after the user sees the search result from the query and selects one of the apps in the search results and downloads that app. Column 204 shows the download information for app 1, and column 205 shows on a per query basis the number of downloads of app 2 in response to the selection of app 2 from search results in a particular query. If there are N apps in the app store then there are N+1 columns in the table shown in FIG. 2. Thus the app store keeps track through use of one or more logs of the number of downloads for a particular app and a particular query. For example, query 207 has N entries along its row, each for one of the N apps in the app store. Downloads 211 represent the number of downloads of app 1 that resulted from user selections of search results provided in response to query 207. Similarly, downloads 213 represent the number of downloads of app 2 as a result of a user selection of the app in search results provided in response to search query 207. In the case of query 208, downloads 212 represent the number of downloads of app 1 as a result of user selections in search results responsive to query 208, and downloads 214 represent the number of downloads of app 2 as a result of user selections from search results provided in response to search query 208. The queries in column 203 can be all queries submitted to the app store in one embodiment, and in another embodiment the set of queries in column 203 can be a selection of or subset of all of the queries submitted to the app store. For example, in one embodiment, the queries in column 203 can be limited to functional search queries and navigational search queries, which are described further below rather than all search queries. Moreover, a subset of the functional search queries and navigational search queries can be used in column 203 rather than all functional search queries and navigational search queries, and this subset can be based upon a threshold value that requires the queries be used more frequently than a certain percentage of the usage of all queries (e.g., eliminate the least frequently used queries). By limiting the set of queries in column 203 to functional search queries and navigational search queries and by further eliminating the search queries in column 203 to a subset of functional search queries and navigational search queries, some of the "noise" may be reduced or eliminated so that only the most relevant queries are used in the distribution data.

The distribution data shown in FIG. 2 can be used for a variety of purposes as described herein. For example, it can be used to determine relevant functional search queries for a given app in the app store and it can be used to classify search queries in order to determine, for example, whether a search query is a functional search query or a navigational search query.

FIG. 3 shows an example of the use of the distribution data to determine that a particular query is in fact a query for a specific application which can also mean that it is a navigational search query and not a functional search query. Further information in connection with classifying search queries as navigational search queries or functional search queries can be found in U.S. Patent Application Publication No. US2013/0325892 which is hereby incorporated by reference herein. The graph 301 shown in FIG. 3 shows a distribution curve 304 which depicts the number of downloads for each app in the app store represented by a particular app number which is unique for the app in the app space which is represented by the X axis 302. The Y axis 303 shows the number of downloads for each app in the app space for a particular query. In the example shown in FIG. 3, almost all of the downloads of an app from the app store for the particular query in question are for the app A1, while the remainder of the apps have few if any downloads. In the example shown in FIG. 3, the distribution curve 301 may in fact intersect with the X axis 302 much sooner than shown in FIG. 3. For example, the distribution curve 304 may intersect with the X axis at app $A_3$. The distribution curve 304 can be used to determine that the particular query is in fact a specific query for a specific app which would suggest that the query is in fact the name of the app or at least a portion of the name of the app. In this instance the query can be classified as both a navigational search query and a specific app query. An application specific query is a query that uses the name of the app (or a portion or a variant of the name such as a common misspelling) in the search query. The data underlying the distribution curve 304 may be expressed as a set of proportions or percentages and again will indicate that primarily one app, app $A_1$ is downloaded in response to or as a result of user selections in search results provided in response to the specific query in this example. The following table (Table 1) shows examples of values for these proportions for each downloaded app for a given app name used as the search query (Priceline in this example).

TABLE 1

| Query | Downloaded App | Proportion |
| --- | --- | --- |
| Priceline | Priceline | 0.9012 |
| Priceline | Joe's Almanac | 0.0101 |
| Priceline | OS TuneUp | 0.0042 |
| Priceline | Polar Finder | 0.0031 |

It can be seen from this example in Table 1 that over 90 percent of the time, the search query "Priceline" results in the downloading of the app "Priceline" while all other apps are rarely downloaded in response to that search query. The distribution in Table 1 reveals that the query "Priceline" is a navigational query and is also an app specific query. This can be contrasted to the proportion for the apps in distribution data for general or functional search queries. For example, Table 2 shows an example how users behave for the functional query "shopping".

TABLE 2

| Query | Downloaded App | Proportion |
| --- | --- | --- |
| Shopping | Bargain Hunting | 0.07104 |
| Shopping | Mall Catalog | 0.05102 |
| Shopping | RoboShopping | 0.03901 |
| Shopping | French Baking | 0.00191 |

It can be seen from the proportions shown in Table 2 that no particular app is predominant in this distribution; in particular, in the example of Table 2, no app is downloaded more than 10 percent of the time as a result of the search query "shopping". Thus, the query "shopping" can be classified as a general or functional search query. Tables 1 and 2 are sorted lists of downloaded apps for a particular query, with the lists sorted from the most downloaded to least downloaded. In one embodiment, a search query can be classified as a navigational search query when the distribution data indicates a small number of unique applications were downloaded as a result of the search query, where the small number may be less than five applications or three applications. In another embodiment, a search query may be classified as a navigational search query when the distribution data indicates that a small number of unique applications were downloaded as a result of the search query, and for each of those small number of applications, their proportion is greater than a threshold, such as a predetermined threshold (e.g. more than 0.25 or some other value).

Figure 4:
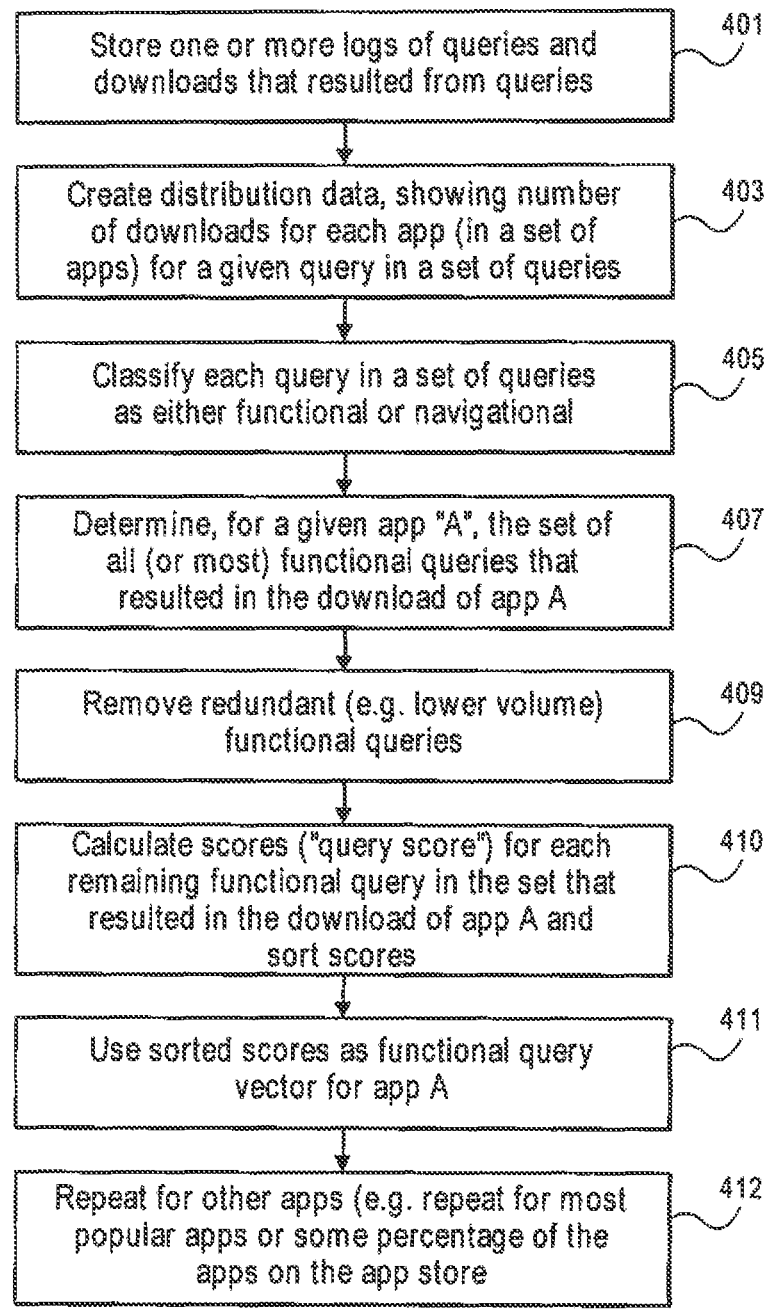
FIG. 4 is a flowchart that illustrates a method, according to an embodiment described herein, to determine a set of functional queries for a given app in an app store.
Figure 5:
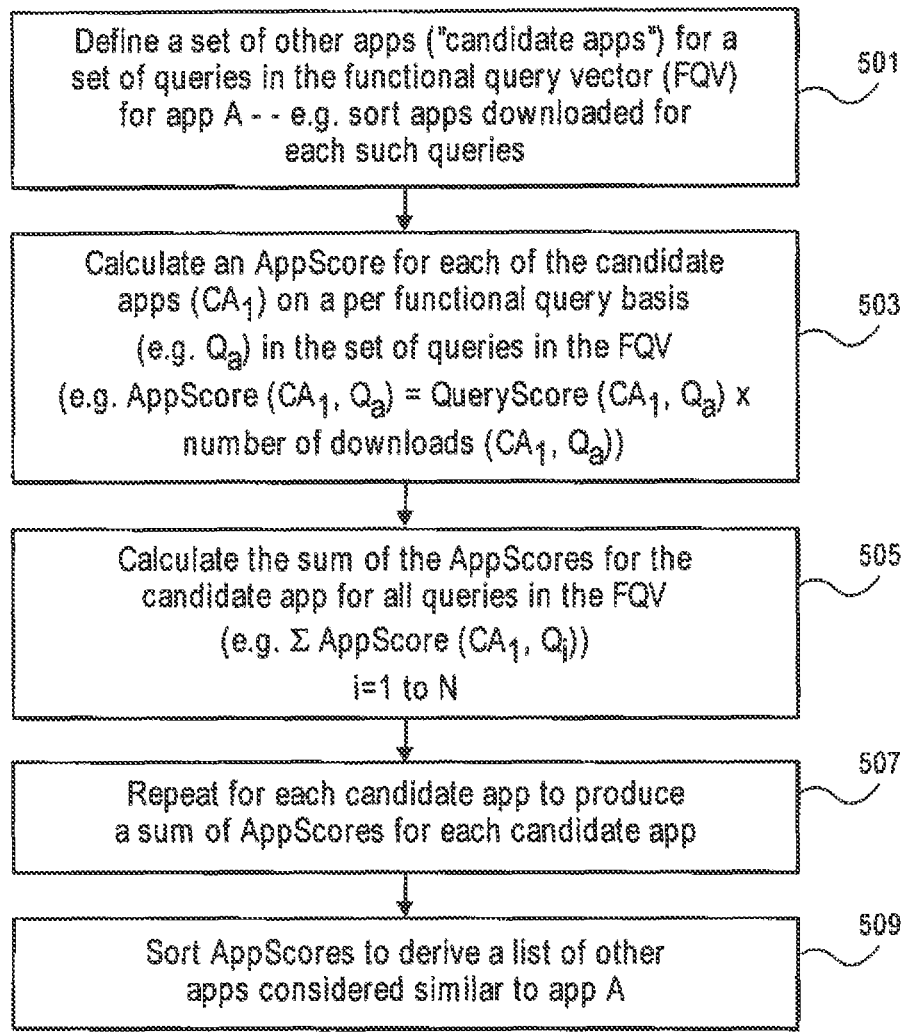
FIG. 5 is a flowchart that shows a method, according to an embodiment described herein, to determine a set of other apps that appear to be similar to a given app based upon distribution data.

In one or more embodiments described herein, the distribution data can be used to generate a list of other applications which are considered similar to a particular application and this list of other applications can be introduced into search results provided in response to a search query which includes the name of the application or at least a portion of the name of application. For example, in one embodiment, an association between the app which has the name "Priceline" can be generated such that other functionally similar applications are also listed in search results provided in response to the search query "Priceline". In one embodiment, this association can be generated from the distribution data by identifying functional search queries that resulted in downloads of the Priceline app and then using those identified functional search queries to identify other applications that have the same functional abilities or goals as the Priceline app. FIGS. 4 and 5 provide an example of one embodiment in which an app store can use the distribution data to generate such an association. It will be appreciated that "Priceline" is being used as only an example of an existing app, and no endorsement or other commentary is intended by this usage.

In operation 401 of FIG. 4, the app store stores one or more logs of queries used by users and downloads that resulted from those queries. In one embodiment, the app store keeps track of the particular search session that a user engages in with the app store and follows the path of the user's interaction within the search session in the app store in order to determine that the user has made a selection from a search result which was provided in response to a particular search query. This allows the creation of the distribution data in operation 403. This distribution data can be similar to the distribution data shown in FIG. 2 and can be stored in a variety of different data structures such as the table data structure shown in FIG. 2. The distribution data indicates the number of downloads for each app for a given query in a set of queries. As noted above, the app store may limit the set of queries in the distribution data that is used to only navigational and functional search queries and may further limit the set of queries to a subset of the navigational and functional search queries. This can be done by classifying, in operation 405 each query in a set of queries as either a functional search query or a navigational search query. The classification of the query has been described above, where FIG. 3 shows an example of a search query which appears to be an app specific search query which can also be considered to be a navigational search query. In one embodiment, a search query can be classified as a functional search query (and not a navigational search query) when it is estimated, based on the distribution data, that users are searching for an app that performs a function or provides a capability (such as the queries "shopping" or "games"). Functional search queries typically result in the download of many different applications, each of which provides the function or capability. Further information about classifying queries is provided in U.S. Patent Application Publication No. US2013/0325892 which is hereby incorporated herein by reference. It will be appreciated that, in one embodiment, some queries may be classified as unknown and distribution data can be ignored for those queries. Then in operation 407, a data processing system can determine, for a given app, such as app "A", the set of all (or most) functional search queries that resulted in the download of app A. In one embodiment, a threshold can be set in order to eliminate low volume downloads which can remove "noise" from the data. In addition, operation 407 can also include determining one or more navigational search queries for app A; this can involve finding those search queries that result in predominately a download of app A (and have a distribution such as the distribution shown in FIG. 3). In operation 409 redundant functional search queries which tend to be low volume functional search queries can also be removed from the set of search queries that resulted in the download of app A. This tends to favor functional search queries which are used more frequently than other functional search queries that resulted in the download of app A. Then in operation 410, the data processing system can calculate scores, referred to as "Query Score" for each remaining functional query in the set that resulted in the download of app A and can sort the calculated scores. In one embodiment, for a given app, such as app A, there can be a query score for each remaining functional search query that resulted in the download of A, in one embodiment, the score can be calculated based on the following equation.

QueryScore($Q$,App $A$)=log(volume of $Q$)×(number of downloads of App $A$ for Query $Q$)

This query score represents the strength of association between a particular query and the app. Higher volume queries which are used more frequently than other search queries will tend to score higher and hence be sorted higher than lower volume search queries. Similarly, more downloads of a given app for a particular query will cause the query score to be higher than and sorted higher than queries scores in which fewer downloads of a particular app were made for other queries. The sorted list of query scores for a given app can be considered, in operation 411, a functional query vector for a particular app, such as app A, and this functional query vector for a given app is used in the method of FIG. 5 which is described further below. In operation 412, the method of FIG. 4 is repeated for other apps in the app store. In one embodiment, the method can be repeated for each app in the app store or can be repeated for a subset of the apps in the app store, such as a subset determined from the sorted list of the number of downloads of each app, where a threshold is used to eliminate apps that are rarely downloaded relative to the other apps in the app store.

The method shown in FIG. 5 can begin in operation 501 in which a set of other apps, which may be referred to as "candidate apps" can be defined for a set of queries in the functional query vector for app A. The functional query vector for app A is a set of functional queries, each of which has a Query Score which has been computed based upon the method shown in FIG. 4. In one embodiment, the functional query vector for app A specifies the most commonly used queries that are used (based on the distribution data) to search and download app A, and those queries have the strongest association (based on proportions of downloads) to app A relative to other apps FIG. 6 shows an example of how a set of candidate other apps can be defined based upon the queries in the functional query vector for a given app, such as app A. The queries 603, 604, and 605 are each queries in the functional query vector (FQV) for app A shown in column 602 of FIG. 6. Each row in the table 601 represents a sorted list of candidate apps (based on numbers of downloads) created from the distribution data, such as the distribution data shown in FIG. 2 for each query. For example, the sorted list of candidate apps for query 603 shows that the apps are listed in the order $A_3$, $A_9$, $A_{11}$, $A_{50}$, and $A_{501}$ after a threshold 609. The row for query 603 is sorted to show most to least downloaded app from search results provided in response to the query 603; thus app $A_3$ is downloaded more than any other app when query 603 is used to search and download for apps, and hence app $A_3$ is a candidate other application relative to app A (which is different than $A_3$). Similarly, for the search query 604 the sorted list of candidate apps is $A_3$, $A_{11}$, $A_{50}$, $A_{200}$, and finally, after the threshold 609, $A_{300}$. Finally, for the query 605, the sorted list of candidate apps begins with the app $A_3$ and can end with the app 300 which is past the cutoff threshold 609. The cutoff threshold 609 causes an app to be eliminated from the list in one embodiment. In each case, the distribution data is used to provide the number of downloads of a particular app for a given functional query in the FQV for app A. In one embodiment, the download data along a row of the distribution data 201 can be sorted from high to low to achieve the sorted list of candidate apps as shown in FIG. 6. A threshold 609 can be set such that apps that are downloaded less than a certain proportion are not included in the sorted list. In one embodiment, the list of possible candidate apps can be further constrained by requiring that each app in the list of candidate apps has a relatively high download percentage for at last a minimum number (e.g. 2 or 3) of queries in the functional query vector for app A. For example, if app 200 (shown as $A_{200}$ in FIG. 6) appears only once in the table 601, then it does not satisfy a minimum number of queries in the functional query vector. In other words, in one embodiment, the list of candidate apps for app A can be filtered by requiring that each candidate app meets the minimum number of queries in the functional query vector for app A. After the list of candidate apps is defined, then in operation 503, an AppScore is then calculated for each of the candidate apps on a per functional query basis for each query in the set of queries in the functional query vector for app A. In one embodiment, the AppScore can be calculated for each candidate app and each functional query from the set of queries in the functional query vector as follows:

AppScore($CA_1$,$Q_n$)=QueryScore($CA_1$,$Q_a$)×(number of downloads($CA_1$,$Q_a$))

In this equation, $CA_1$ represents one of the candidate apps defined in operation 501 and $Q_a$ represents one of the functional queries in the set of functional queries in the functional query vector for app A which was derived from the method shown in FIG. 4. The query score of candidate app $CA_1$ and the query $Q_a$ is calculated in the same way as the query scores described in FIG. 4. Using this appscore, the system can take into account the frequency of queries and the strength of association between the queries in the functional query vector and app A and the strength of association between each of the queries in the functional query vector and each of the apps in the set of other apps ("candidate apps"). In operation 505 a data processing system can then calculate the sum of all of the app scores for a particular candidate app for all queries in the functional query vector. This provides a single score for each candidate app for a given functional query vector. In one embodiment, the equation shown in operation 505 of FIG. 5 can be used to calculate some of the app scores for a particular candidate app. The method of FIG. 5 is then repeated in operation 507 for each candidate app to produce a sum of app scores for each candidate app which can then be sorted in operation 509 to derive a list of other apps which are considered to be similar to app A. This list of other apps can be stored in an association data structure, such as the association data structure shown in FIG. 7. This association links the name of the particular app to other apps which were regarded as similar because they were produced in the list derived from operation 509. For example, the query "Priceline" can be considered app A in the method of FIG. 4 which produced a set of queries in a functional query vector for the app "Priceline", and that set of queries produced a set of candidate apps, based on the overlap between queries used to find "Priceline" as an app and queries used to find other apps which provide similar functionality of the app "Priceline". In other words, the method of FIG. 5 produces a list of candidate apps which are then scored in operations 503 and 505 and then sorted in operation 509 to yield a list of other apps which are considered similar to the app "Priceline" based upon the overlap of functional queries used to find "Priceline" and functional queries used to find the other apps. Similarly, the query "Yelp" in FIG. 7, which specifies the name of an existing app on the app store is another example of how the distribution data can be analyzed to derive a set of queries in a functional query vector for a given app, such as the app Yelp, which in turn can then be used to derive a set of candidate apps which are sorted as shown in FIG. 7. The table of FIG. 7 provides a way for searches for a specific app by name to also yield other similar apps which will probably provide similar functionality to the app which was specified by name in the search query. The sorted list of other apps for each query can then be processed in a way such that they appear in the search results returned in response to the query which specifies an existing application by name, such as a search query "Priceline" or a search query that specifies "Yelp". In one embodiment, the search results can list the app specified by name in the search query as the first search result ("top hit") and then can list the other apps identified in the association as the next set of search results following the top hit and can then list other search results, such as search results obtained using conventional text searching methods which would produce results based upon matches of the search query to text in metadata, such as in application description pages which are provided by an app store to allow users to read about and learn about an application.

There are a number of ways in which the association data for each query can be used when providing search results. In one embodiment, the list of sorted apps can be injected into the search results in response to receiving a particular query that matches an existing query in the association data. Again, FIG. 7 represents an example of the association data, and shows how when the navigational query "Priceline" is received, the system can return the names in the list of the sorted other applications which were associated with the query "Priceline". In another embodiment, the search results can be provided by ORing the names of the other applications in the association data for a given navigational query into the search query itself; in other words, the search query is modified by adding the other apps by name into the query with logical ORs between each of the names in the search query. Thus conventional text searching methods can be used with this modified search query. In another embodiment, a field can be added into the metadata for the target app (e.g. the app "Priceline" when the user types the term "Priceline" into the search query), and the names of the associated apps in the association data can be introduced into that added field (a similar app field) such that at search time a server can inject all apps named in that field into the search results immediately after the name of the target app specified in the search query. In another embodiment, the name for the target app (e.g. "Priceline") can be inserted into the text metadata for all other apps specified in the association. For example, for each of the apps associated with the query "Priceline" the term "Priceline", is inserted into the metadata for these other apps which have been associated with the query "Priceline".

FIG. 8 shows an example of an app store data structures and storage. In this storage 801, there is the distribution data 803 which has been described above, and there is association data 807 which associates app specific queries, in one embodiment to their corresponding associated apps. Thus data 807 is similar to what is shown in FIG. 7. In addition, storage 801 can also include executable binaries for the apps which are suitable for downloading and installing on client devices. This is shown as apps 809 stored in storage 801 in the app store. The app store can also include logs of the queries 811 which log not only the queries as described herein, but also the downloads that result from the queries. Further, the app store storage 801 can also include the app metadata which in one embodiment can be an inverted index of the text metadata which is derived from the application description pages by indexing those application description pages to produce a full text index that can be searched according to conventional text searching techniques.

Figure 9:
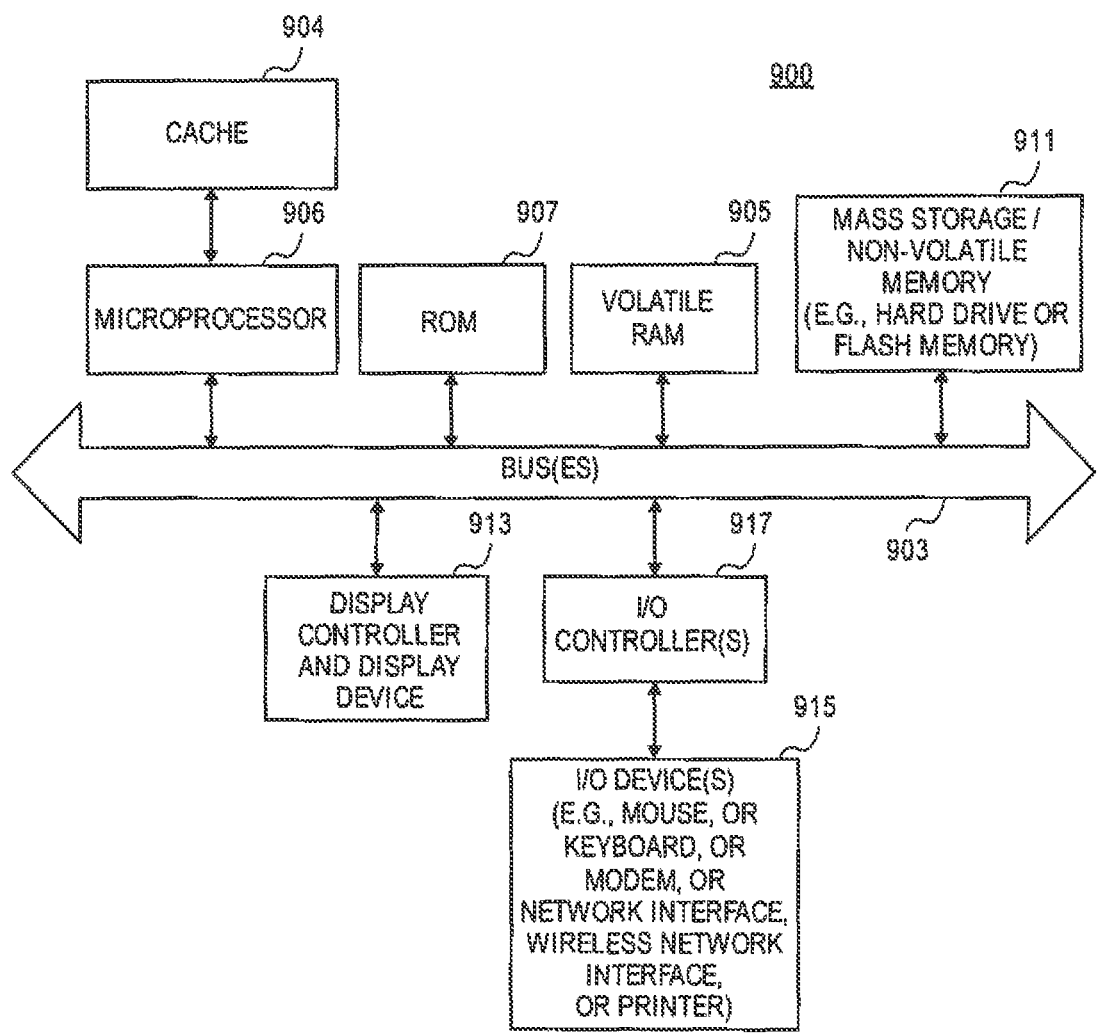
FIG. 9 is an example of a data processing system that can be used to implement any one of the servers or client devices described herein.

FIG. 9 shows one example of a data processing system, which may be used with any one of the embodiments described herein. Note that while FIG. 9 illustrates various components of a data processing system, it is not intended to represent any particular architecture or manner of interconnecting the components as such details are not germane to this description. It will also be appreciated that network computers, tablet computers, smartphones, laptop computers, desktop computers, other consumer electronic devices and other data processing systems which have fewer components or perhaps more components than those shown in FIG. 9 may also be used with one or more embodiments described herein. The servers described herein can be implemented in a form similar to that shown in FIG. 9, and the client devices described herein can be implemented in a form similar to that shown in FIG. 9.

As shown in FIG. 9, the computer system 900, which is a form of a data processing system, includes a bus 903 which is coupled to one or more microprocessor(s) 906 and a ROM (Read Only Memory) 907 and volatile RAM 905 and a non-volatile memory 911. The microprocessor 905 is coupled to optional cache 904. The microprocessor 906 may retrieve the stored instructions from one or more of the memories 907, 905 and 911 and execute the instructions to perform operations described above. These memories represent examples of machine readable non-transitory storage media that can store or contain computer program instructions which when executed cause a data processing system to perform the one or more methods described herein. The bus 903 interconnects these various components together and also interconnects these components 906, 907, 905 and 911 to a display controller and display device 913 and to peripheral devices such as input/output (I/O) devices 915 which may be one or more of mice, touch screens, much pads, much sensitive input devices, keyboards, modems, network interfaces, printers and other devices which are well known in the art. Typically, the input/output devices 915 are coupled to the system through input/output controllers 917. The volatile RAM (Random Access Memory) 905 is typically implemented as dynamic RAM (DRAM) which requires power continually in order to refresh or maintain the data in the memory.

The mass storage 911 is typically a magnetic hard drive or a magnetic optical drive or an optical drive or a DVD RAM or a flash memory or other types of memory system which maintain data (e.g., large amounts of data) even after power is removed from the system. Typically the mass storage 911 will also be a random access memory although this is not required. While FIG. 9 shows that the mass storage 911 is a local device coupled directly to the rest of the components in the data processing system, it will be appreciated that one or more embodiments may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Figure 10:
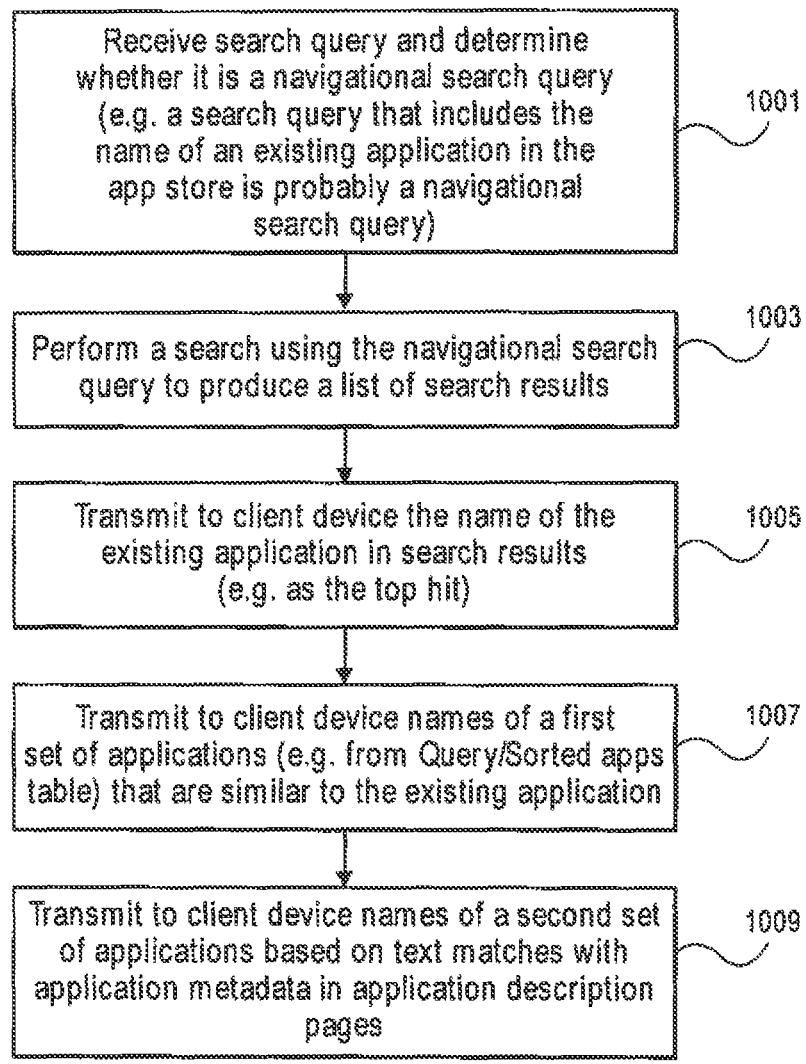
FIG. 10 is a flowchart which shows an example of a method performed at search time in response to a search query received from a data processing system such as a client device.

FIG. 10 shows a method at search time of how one or more servers in the app store can respond to a search query according to one or more embodiments described herein. In operation 1001, a search query is received, and a data processing system can determine whether the search query is a navigational search query which includes the name of an existing application. In operation 1003, a data processing system can perform a search using the navigational search query to produce a list of search results and then transmit the search results in operations 1005, 1007, and 1009 as shown in FIG. 10. The search results can be sorted in an order in which the application specified by name in the navigational search query is listed first and then the sorted list of other applications derived by the methods of FIGS. 4 and 5, which resulted in the association data shown for example in FIG. 7. The search results can further include a list of other applications based on text matches with the application metadata in the application description pages.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A method for processing search queries used to search for applications in an app store, the method comprising:
   collecting a plurality of distribution data for a plurality of search queries, wherein a distribution data for a search query indicates a number of downloads of one or more applications from the app store based on search results produced from the search query;
   classifying each search query from the plurality of search queries as a functional search query or a navigational search query based upon the distribution data for the search query;
   determining, for a first application in the app store, a set of functional search queries used to search for the first application that led to downloads of the first application based upon a set of the distribution data, wherein the set of the distribution data for the set of functional search queries indicates that each of the functional search queries results in user selections to download the first application from search results produced from the set of functional search queries; and
   determining, for the first application, a first set of one or more other applications that are similar to the first application based upon the set of the distribution data which indicates an overlap of the set of functional search queries that led to downloads of the first application and a subset of the functional search queries that led to downloads of the first set of one or more other applications, wherein the subset of the functional search queries that led to downloads of the first set of one or more other similar applications is determined based upon the set of the distribution data that indicates that each of the subset of the functional search queries results in user selections to download the one or more other similar applications based on search results produced from the subset of the functional search queries, wherein the determining of the first set of other applications creates an association between the first application and the first set of other applications, wherein the association takes into account the frequencies of the set of functional search queries and a strength of association between the first application and each query in the set of functional search queries and a strength of association between each application in the first set of other applications and each query in the set of functional search queries, wherein the strength of association between an application and a query measures a proportion of downloads of the application based on the query.

2. The method of claim 1, the method further comprising:
   storing, in one or more data structures, an association between the first application and the first set of other applications.

3. The method of claim 2, wherein the association is used to provide search results in response to a navigational search query that specifies the first application by name so that the search results include the first application and the first set of one or more other applications.

4. The method of claim 1, wherein the search results also include a second set of other applications that are found based on textual matches with application metadata in application description pages provided through the app store, and wherein the search results are sorted to show the results in an order in which the first application is listed first and then the first set of other applications and then the second set of other applications.

5. The method of claim 1, wherein the distribution data is used to repeat the method for each application in a set of applications in the app store such that for each application in the set of applications there is a stored association between each application and a set of other similar applications and wherein the functional search queries that led to downloads of the first set of other applications are a subset of the set of functional search queries.

6. The method of claim 1, wherein determining the set of functional search queries used to search for the first application comprises reducing redundant functional search queries to eliminate the redundant functional search queries from the set of functional search queries used to search for the first application.

7. The method of claim 1, wherein a search query is classified as a navigational search query when distribution data, which represents the number of downloads that resulted from the search query, indicates a small number of unique applications were downloaded as a result of the search query.

8. The method of claim 7 wherein the small number is less than 5 and wherein the overlap is required to be a minimum of 2 or more functional search queries.

9. A non-transitory machine readable medium storing executable instructions which when executed by one or more processing systems cause the one or more processing systems to perform a method for processing search queries used to search for applications in an app store, the method comprising:
   collecting a plurality of distribution data for a plurality of search queries, wherein a distribution data for a search query indicates a number of downloads of one or more applications from the app store based on search results produced from the search query;
   classifying each search query from the plurality of search queries as a functional search query or a navigational search query based upon the distribution data for the search query;
   determining, for a first application in the app store, a set of functional search queries used to search for the first application that led to downloads of the first application based upon a set of the distribution data, wherein the set of the distribution data for the set of functional search queries indicates that each of the functional search queries results in user selections to download the first application from search results produced from the set of functional search queries; and determining, for the first application, a first set of one or more other applications that are similar to the first application based upon the set of the distribution data which indicates an overlap of the set of functional search queries that led to downloads of the first application and a subset of the functional search queries that led to downloads of the first set of one or more other applications, wherein the subset of the functional search queries that led to downloads of the first set of one or more other similar applications is determined based upon the set of the distribution data that indicates that each of the subset of the functional search queries results in user selections to download the one or more other similar applications based on search results produced from the subset of the functional search queries, wherein the determining of the first set of other applications creates an association between the first application and the first set of other applications, wherein the association takes into account the frequencies of the set of functional search queries and a strength of association between the first application and each query in the set of functional search queries and a strength of association between each application in the first set of other applications and each query in the set of functional search queries, wherein the strength of association between an application and a query measures a proportion of downloads of the application based on the query.

10. The medium of claim 9, the method further comprising:
storing, in one or more data structures, an association between the first application and the first set of other applications.

11. The medium of claim 10, wherein the association is used to provide search results in response to a navigational search query that specifies the first application by name so that the search results include the first application and the first set of one or more other applications.

12. The medium of claim 9, wherein the search results also include a second set of other applications that are found based on textual matches with application metadata in application description pages provided through the app store, and wherein the search results are sorted to show the results in an order in which the first application is listed first and then the first set of other applications and then the second set of other applications.

13. The medium of claim 9, wherein the distribution data is used to repeat the method for each application in a set of applications in the app store such that for each application in the set of applications there is a stored association between each application and a set of other similar applications and wherein the functional search queries that led to downloads of the first set of other applications are a subset of the set of functional search queries.

14. The medium of claim 9, wherein determining the set of functional search queries used to search for the first application comprises reducing redundant functional search queries to eliminate the redundant functional search queries from the set of functional search queries used to search for the first application.

15. The medium of claim 9, wherein a search query is classified as a navigational search query when distribution data, which represents the number of downloads that resulted from the search query, indicates a small number of unique applications were downloaded as a result of the search query.

16. The medium of claim 15 wherein the small number is less than 5 and wherein the overlap is required to be a minimum of 2 or more functional search queries.

* * * * *